Oct. 24, 1967   H. POST ET AL   3,348,585
METHOD OF MAKING INDUSTRIAL BELTS WITH STRENGTH WIRE MEMBERS
THEREIN AND APPARATUS FOR STRAIGHTENING AND TENSIONING
SUCH STRENGTH WIRE MEMBERS
Filed May 20, 1964
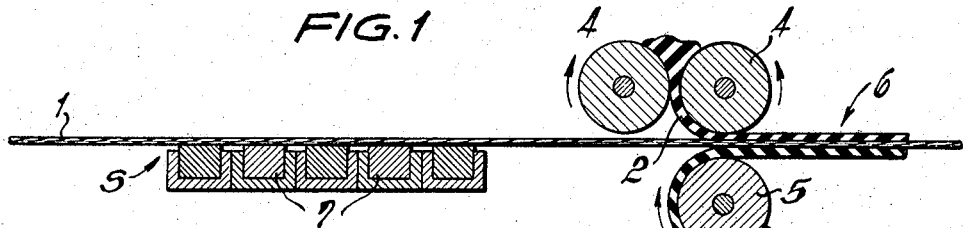
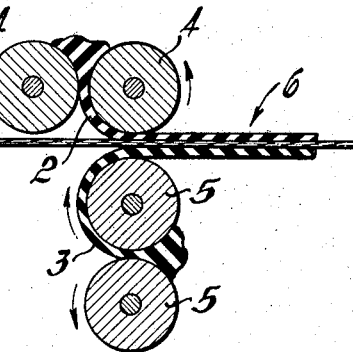
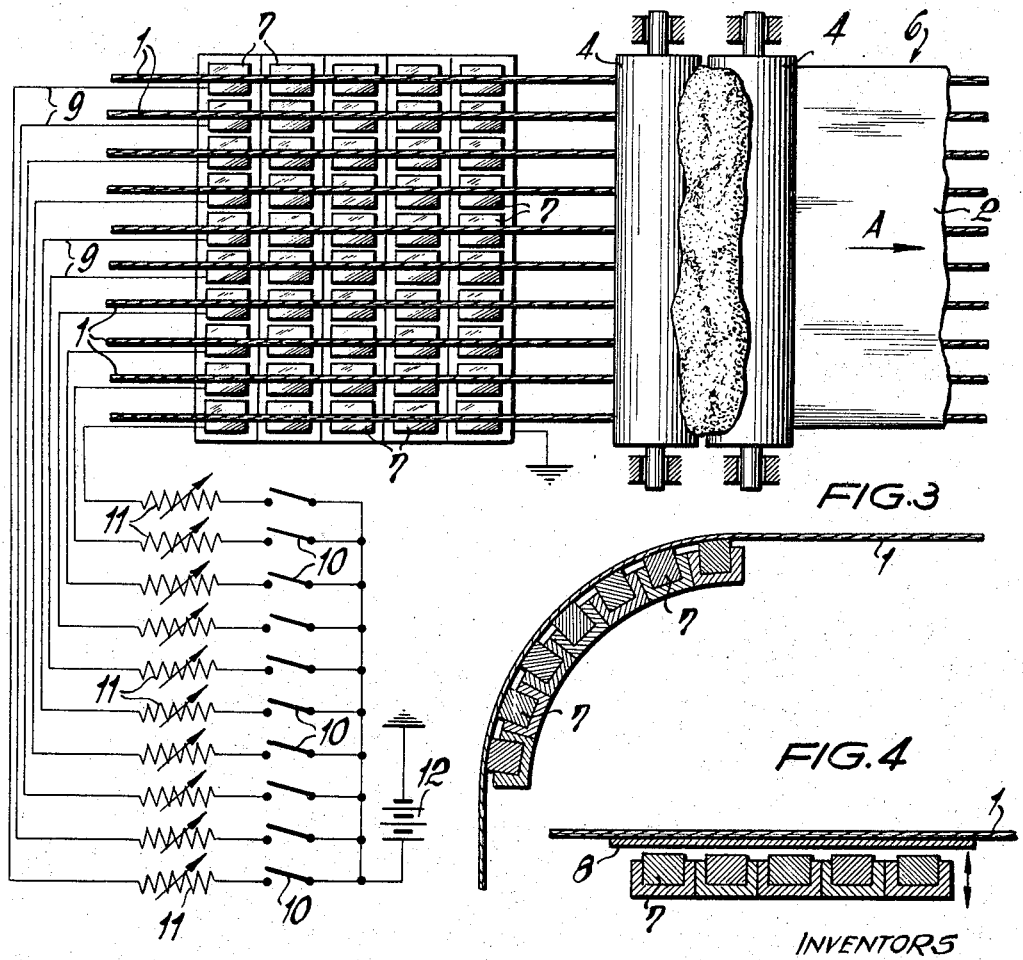
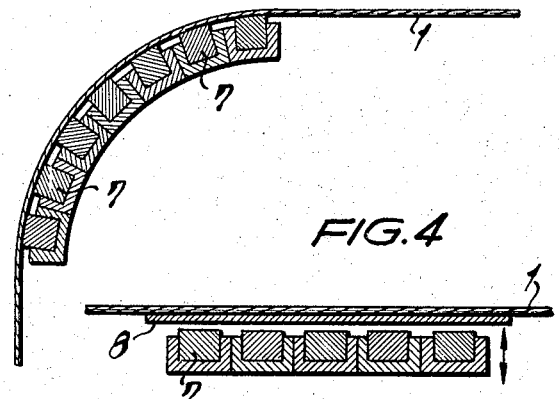
INVENTORS
Hermann POST
Friedrich W. WEIGEL
BY ns or the like brings about the desired pulling tension in the wire elements, cable elements or the like.

3,348,585
METHOD OF MAKING INDUSTRIAL BELTS WITH STRENGTH WIRE MEMBERS THEREIN AND APPARATUS FOR STRAIGHTENING AND TENSIONING SUCH STRENGTH WIRE MEMBERS
Hermann Post and Friedrich-Wilhelm Weigel, Hannover, Germany, assignors to Continental Gummi-Werke Aktiengesellschaft, Hannover, Germany
Filed May 20, 1964, Ser. No. 368,861
Claims priority, application Germany, May 28, 1963, C 30,102
3 Claims. (Cl. 140—147)

The present invention relates to a method of and device for straightening of wires and cables especially prior to and in connection with their incorporation in layers, belts and the like. More specifically, the present invention concerns the straightening of parallel wires, cables or the like of ferro-magnetic materials which are moved in longitudinal direction thereof by a common pulling force.

In connection with the manufacture of conveyor belts of rubber or other elastic materials, it is customary to embed steel wires therein. Similarly, when building up pneumatic vehicle tires, rubberized steel cords are embedded in or between the layers. In connection with manufacturing processes of the above mentioned type, it is of great importance to exert a uniform pulling tension upon the wire inserts or the like over the entire width of the respective web.

The heretofore employed tensioning and straightening devices for the wire, cable inserts and the like are based on braking the moved web elements by purely mechanical means, for instances by braking drums with friction clutches. When a greater number of individual braked wires is involved, the corresponding devices become rather expensive and require considerable space, whereas the space saving common braking of all wires results in the lack of manufacturing precision and uneven wear in operation of the manufactured article.

It is, therefore, an object of the present invention to provide a method of and device for tensioning and straightening wires, cables and the like, which will overcome the above mentioned drawbacks.

It is also an object of this invention to provide a method of an device as set forth in the preceding paragraph, which will be extremely simple and inexpensive.

These and other objects and advantages of the invention will appear more clearly from the following specification in connection with the accompanying drawing, in which:

FIG. 1 illustrates in side view a device according to the present invention with permanent magnets.

FIG. 2 is a top view of the device similar to that shown in FIG. 1, but with electromagnets instead of permanent magnets.

FIG. 3 illustrates a side view of an arrangement similar to the left-hand portion of FIG. 1 but with the magnets arranged along a curved surface.

FIG. 4 shows a modification over the left-hand portion of FIG. 1 inasmuch as a plate is provided between the wires to be straightened and the magnets, said magnets being adjustable relative to said plate.

The present invention is characterized primarily in that non-interwoven wires, cables or the like of ferro-magnetic material are, for purposes of tensioning and straightening the same, passed over stationary supporting means permeated or penetrated by magnetic lines of force. The magnetic pulling force presses the magnetizable elements such as wires, cables or the like during their movement against the surface of the fixed supporting means, and the thus produced sliding friction which acts against the pulling force exerted upon the wire and cable elements or the like brings about the desired pulling tension in the wire elements, cable elements or the like.

Referring now to the drawing in detail, the arrangement shown therein concerns an apparatus for covering a plurality of parallel steel wires or steel cables 1 from both sides with rubber layers 2, 3 by means of a four-roller calender 4, 5. In the finished web 6 leaving the calender in the direction of the arrow A (FIG. 2) in order to be subjected to vulcanization or further processing, it is of foremost importance for avoiding a faulty product, that differences in the tension in adjacent reinforcing wires 1 be compensated for as far as possible. To this end, the wires 1 must enter the calender at a uniform preload.

As will be seen from the drawing, in spaced relationship to and ahead of the calender 4, 5 there is provided a supporting means generally designated S over which the individual wires 1 are passed. This supporting means S may either form a magnetic plate or may consist of a plate covering a plurality of magnets. In the last mentioned instance, the course of the magnetic lines may be influenced in any desired way by inserting intermediate layers. According to a further development of the present invention, the magnetic field intensity may be varied by arranging the supporting plate displaceable relative to the magnets.

In view of the magnetic force exerted upon the wires 1, these wires will be pressed against the supporting means. According to the specific embodiment shown in the drawing, the magnetic plate is composed of five rows of permanent magnets arranged one behind the other. Inasmuch as the calender rollers 4, 5 or a pulling and winding device following said calender rollers, but not shown in the drawing, exerts upon the wires 1 a pulling force in excess of the magnetic force exerted upon and tending to hold the wires against the supporting plate, it will be appreciated that the said wires will, under a uniform load, pass between the calender rollers where they are covered by rubber layers 2 and 3.

As will be seen from the above, the arrangement according to the present invention for holding the wire means such as wires, stranded wires, and cables has practically no movable parts and consequently, is liable to few, if any disorders. The employment of permanent magnets yields a particularly simple construction, while the employment of electromagnets instead of permanent magnets, which is likewise possible in conformity with this invention, offers the advantage of an easy control of the holding force exerted upon the wire means to be straightened and tensioned.

According to the arrangement of FIG. 2, the magnets 7a associated with the individual wires or cables 1 are respectively connected to a current source 12 by means of conductors 9. Each conductor 9 has interposed therein a switch 10 and a variable resistor 11. In this way, the magnets 7a may be energized or de-energized individually or in groups. It is also possible to vary the intensity of the magnetic field of the magnets 7a by adjusting the respective resistor 11.

Advantageously, the magnets are arranged one behind the other while extending across the path over which the wire means are to be moved. It will be appreciated that the provision of separate magnets arranged alongside each other in the longitudinal direction of the path over which the wire means are moved is not practical because frequently, the distance between the individual wire means such as wires, cables, stranded wires and the like amounts to a few millimeters only. On the other hand, the grouping of the magnets transverse to the path of movement of the wire means permits control of the individual wires or the like and also the control of groups of wires.

In conformity with a further development of the invention, the magnets may be so selected that they have a different force of attraction in the direction of movement of the wires. To this end, it is merely necessary to turn plate P by 90° in which instance, of course, unless plate P is made square, the outer wires will either have to be removed or all wires will have to be placed closer to each other. Inasmuch as the produced frictional forces add up in the longitudinal direction of the path of movement of the wire means, the differences in the force of attraction are evenly effective over the width of the path over which the wire means move. It is merely necessary that the magnetic force of attraction is evenly distributed over the width of the moved wires as it is exerted at all points of the support for the wire means.

According to the arrangement of FIG. 4, the wires to be straightened are supported by a stationary support 8 of ferro-magnetic material, and the magnets below said support 8 are adjustable relative to said support by any convenient means, if desired manually, as indicated by the double arrow D whereby the magnetic holding force exerted on said wires will be varied.

It is, of course, to be understood that the present invention is, by no means, limited to the particular arrangements shown in the drawings, but also comprises any modifications within the scope of the appended claims.

What we claim is:

1. A method of making industrial belts of rubber material having embedded therein longitudinally extending approximately parallel strength wire members of ferro-magnetic material, especially single wires, stranded wires, and cables, which includes the steps of: in a continuous manner mechanically pulling the wire strength members in approximately parallel and laterally spaced arrangement to each other and in the longitudinal direction thereof over a stationary support while simultaneously magnetically pulling each strength wire member against said support so as to maintain said strength wire members parallel to each other at the respective desired lateral spacing and at the same time exerting braking force thereon relative to the pulling force exerted upon the wire strength members in the longitudinal direction thereof, and in a continuous manner applying rubber material upon those respective portions of said strength wire members which have left said support.

2. A method according to claim 1, in which each wire strength member is individually and in a controllable manner magnetically pulled against said support.

3. An apparatus for straightening and tensioning a plurality of parallel wires in laterally spaced relationship to each other, especially single wires, stranded wires and cables, and incorporating the same in rubber belt material, which includes: supporting means adapted to slidingly support a plurality of laterally spaced substantially parallel wires, magnetic means arranged below said supporting means and operable continuously to exert controllable pulling power upon wires slidably moving on said supporting means to thereby exert a bracing force thereon while simultaneously retaining the said wires in their respective parallel position with regard to each other, a pair of roller means arranged past said supporting means when looking in the direction of movement of said wires over said supporting means and operable to pull said wires therebetween, and means associated with said roller means for applying rubber material to opposite sides of said wires while they are about to pass between said roller means.

References Cited

UNITED STATES PATENTS

| | | | |
|---|---|---|---|
| 1,776,775 | 9/1930 | Biggert | 72—54 |
| 1,782,425 | 11/1930 | Jessup | 72—205 |
| 2,433,014 | 12/1947 | Rendel | 242—75.2 |
| 2,731,212 | 1/1956 | Baker | 226—93 |
| 2,740,459 | 4/1956 | Kilborn et al. | 156—494 |
| 3,272,680 | 9/1966 | Paasche | 156—160 |

CHARLES W. LANHAM, *Primary Examiner.*

L. A. LARSON, *Assistant Examiner.*